Figures 13, 15:
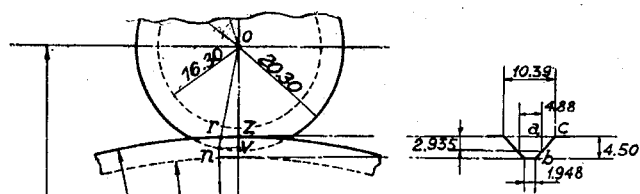

May 15, 1951 A. ROANO 2,553,383
HELICAL GEARING
Filed July 14, 1947 7 Sheets-Sheet 1
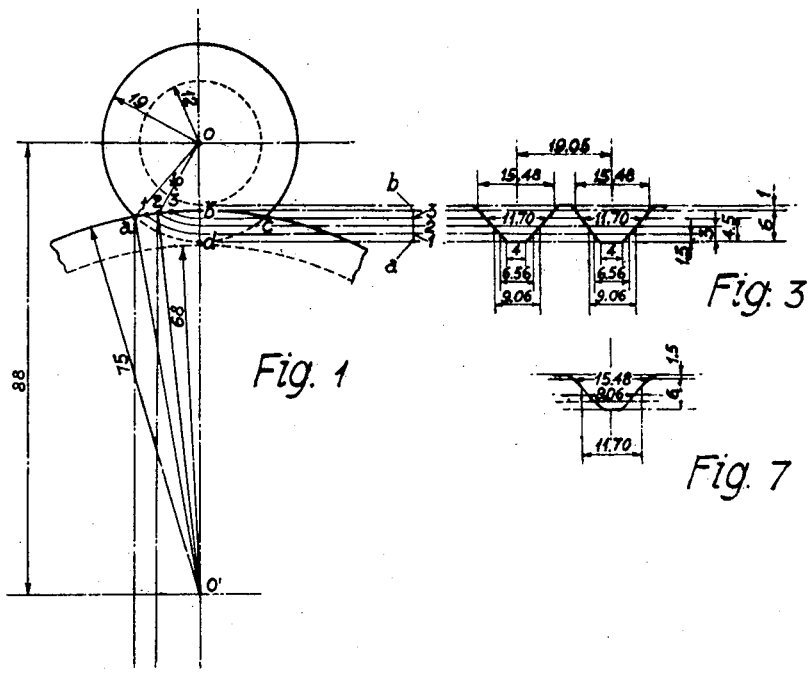
Fig. 1
Fig. 3
Fig. 7
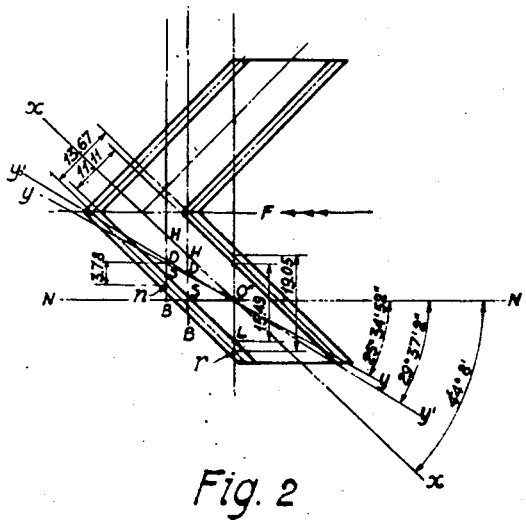
Fig. 2
INVENTOR
A. ROANO
BY
Howard P. King
ATTORNEY

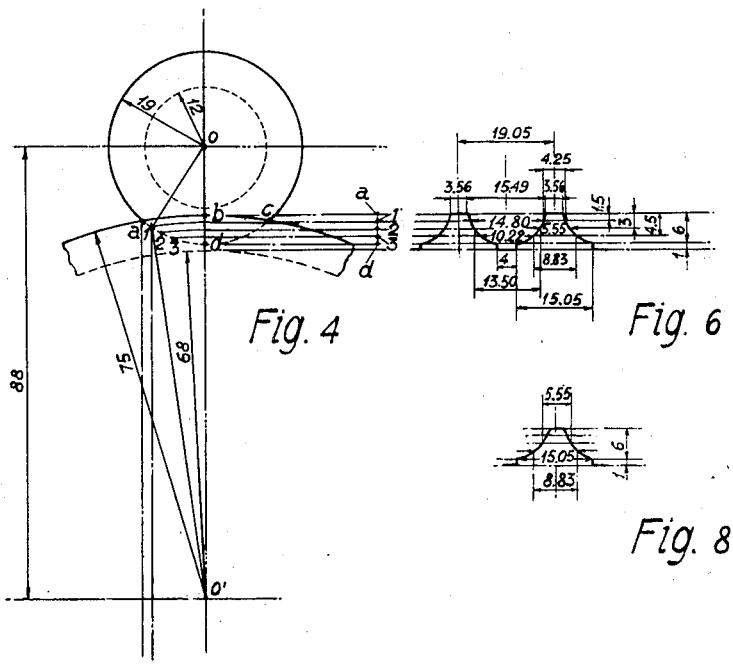
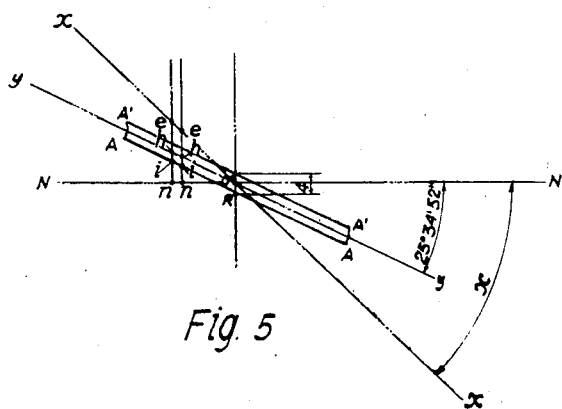

May 15, 1951  A. ROANO  2,553,383
HELICAL GEARING
Filed July 14, 1947  7 Sheets-Sheet 3
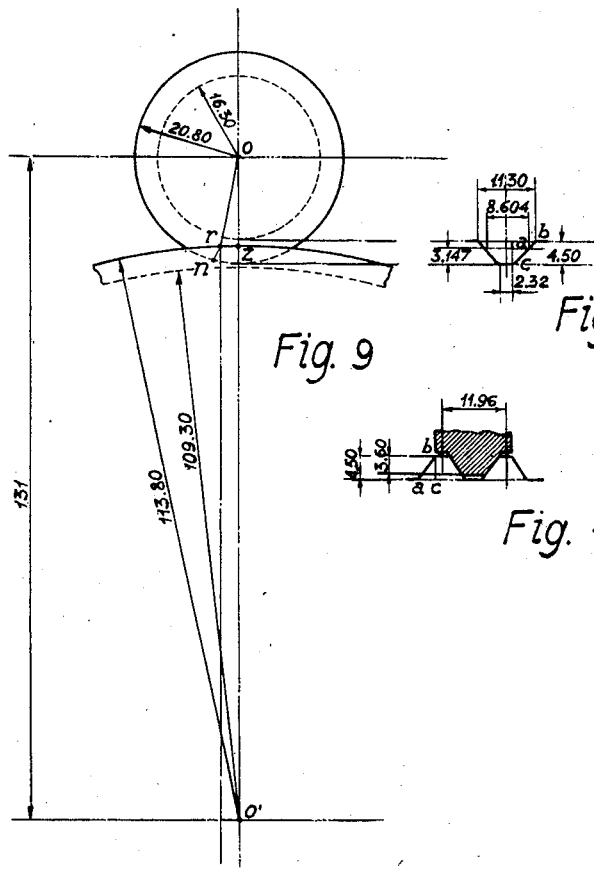
Fig. 9
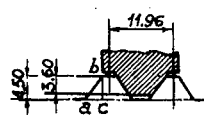
Fig. 12
Fig. 11
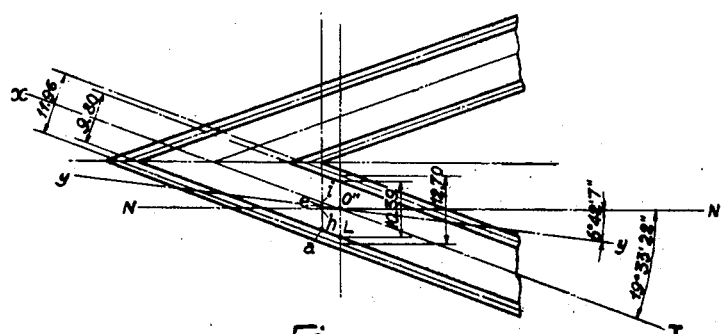
Fig. 10
INVENTOR
A. ROANO
BY
Howard P. King
ATTORNEY May 15, 1951  A. ROANO  2,553,383
HELICAL GEARING Filed July 14, 1947  7 Sheets-Sheet 5

INVENTOR
A. ROANO
BY
Howard P. King
ATTORNEY

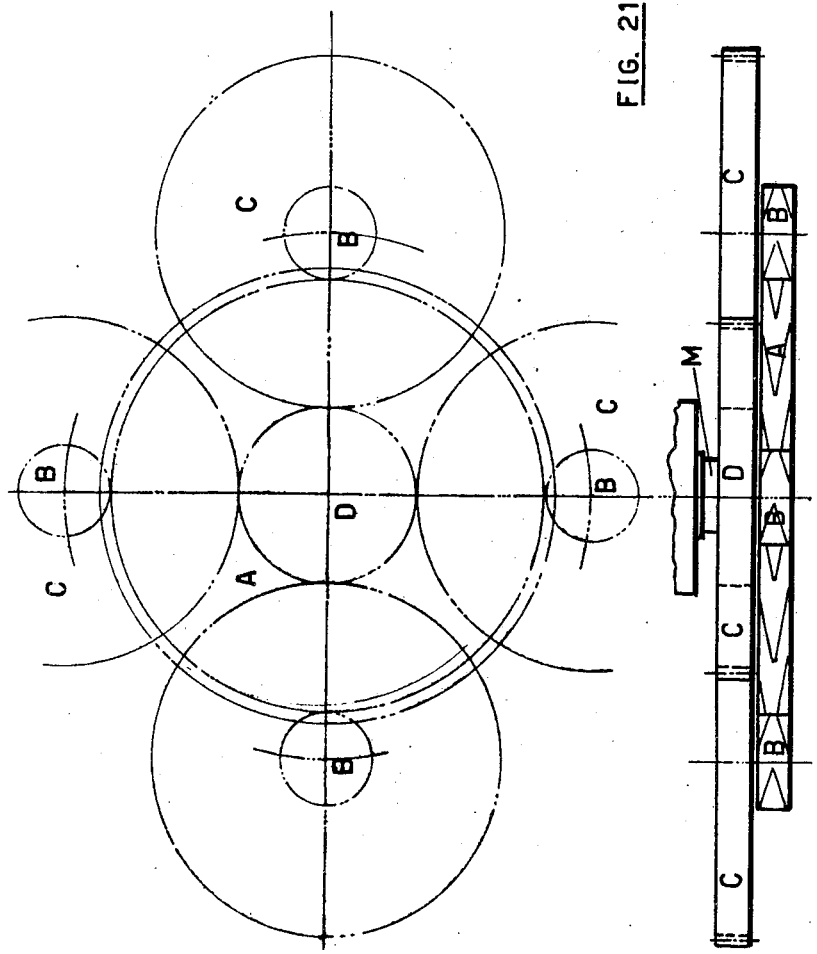

May 15, 1951 — A. ROANO — 2,553,383
HELICAL GEARING

Filed July 14, 1947 — 7 Sheets-Sheet 7

INVENTOR
A. ROANO
BY
Howard P. King
ATTORNEY

Patented May 15, 1951

2,553,383

UNITED STATES PATENT OFFICE 2,553,383

HELICAL GEARING

Alessandro Roano, Genoa, Italy

Application July 14, 1947, Serial No. 760,842
In Italy July 8, 1946

Section 1, Public Law 690, August 8, 1946
Patent expires July 8, 1966

3 Claims. (Cl. 74—466)

The present invention relates to gear trains and more particularly single or double helical reciprocal and irreversible gear wheels meshing between parallel axes.

An object of the invention is to provide high velocity ratios by means of a single gear pair so reducing the space occupied and the weight and cost of the whole gearing as compared to known gear trains of comparable ratios.

A further object of the invention consequential upon this is to make the diameters of the driven gears considerably smaller than would normally be required for the given gear ratio so that no limiting bounds between the speed ratios and the respective diameters would exist for a very wide set of gears.

A further object of the invention is to make the contact between the engaging teeth substantially over the whole area bounded by the arcs of engagement between the gears.

The provision of an extended contact surface has for its object to reduce the pressure per unit area of surface contact to very low values and consequently to obtain high efficiency notwithstanding the sliding movement that is present between the gear teeth due to the reduction of the diameters of the driven gears.

In this connection it is to be noted that the reduction of the pressure per unit area of surface contact is very considerable when compared with the known gear wheels as well as with the gear wheels patented by the present applicant in Italy under date June 5, 1929, July 7, 1930, and December 18, 1930, with corresponding patents in Great Britain, Germany and the U. S. A. in the years ranging from 1929 to 1932.

These patents state that the contact between the teeth is limited to the edge threads of the gear teeth and to the edge threads of the pinion teeth as well as to other line contacts and never to surfaces. This resulted in the practical applications following the basic principles of the aforesaid patents never leading to good results and thus preventing any advantage being gained in the reduction in diameter of the driven gears.

Figure 16:
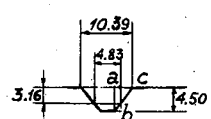
Figure 17:
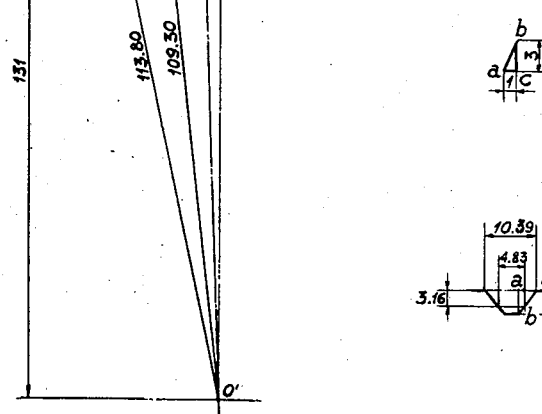
Figure 14:
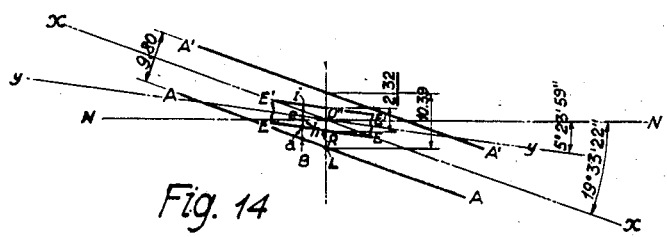
Figure 18:
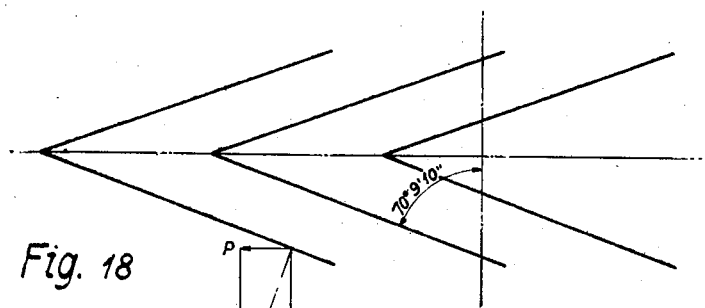
Figure 20:
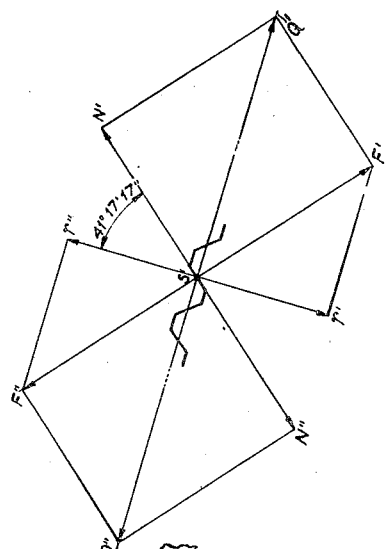
Figure 19:
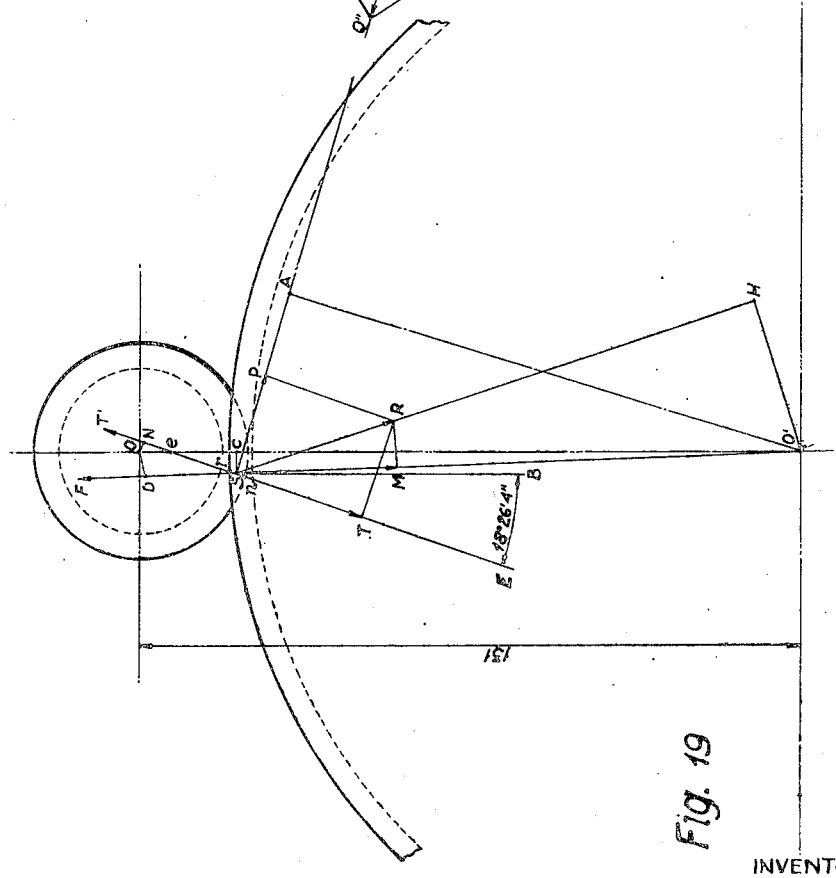

The invention will now be described with reference to the accompanying drawings in which:

Figure 1 shows diagrammatically in side elevation a gear wheel and pinion in mesh, Figure 2 shows diagrammatically a partial plan view of two consecutive teeth of the wheel, Figure 3 shows diagrammatically in section the profile of the pinion teeth, Figure 4 is a partial reproduction of Figure 1, Figure 5 is a development of Figure 4, Figure 6 shows in profile the teeth of the gear wheel, Figure 7 shows the final profile of the teeth of the pinion, Figure 8 shows the final profile of the teeth of the gear wheel, Figure 9 shows an irreversible gear pair in mesh, Figure 10 shows diagrammatically a partial plan view of two consecutive teeth of the wheel shown in Figure 9, Figure 11 shows profiles of the pinion and gear wheel in mesh, Figure 12 shows diagrammatically a profile of the pinion teeth, Figure 13 shows diagrammatically a pinion and gear wheel in mesh in side elevation, Figure 14 is a diagrammatical plan view of part of Figure 13, Figure 15 is a profile of the gear wheel teeth, Figure 16 is a geometrical figure extracted from the profile of the gear wheel teeth shown in Figure 15, Figure 17 is a further profile of the gear wheel teeth, Figure 18 is a diagrammatical plan view of a part of the gear wheel, Figure 19 is a reproduction of Figures 9 and 13, Figure 20 is a profile of the gear wheel teeth, Figure 21 shows diagrammatically in elevation and plan an assembly of gears according to the present invention.

Figure 22:
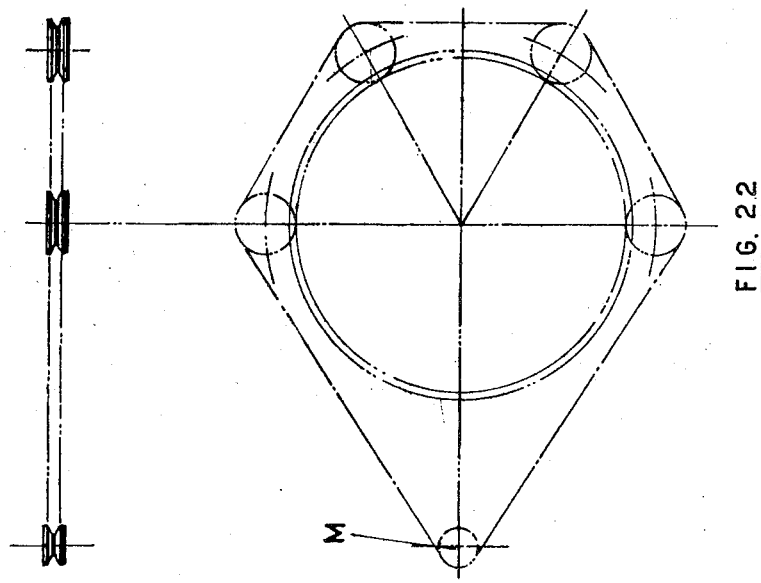
Figure 23:
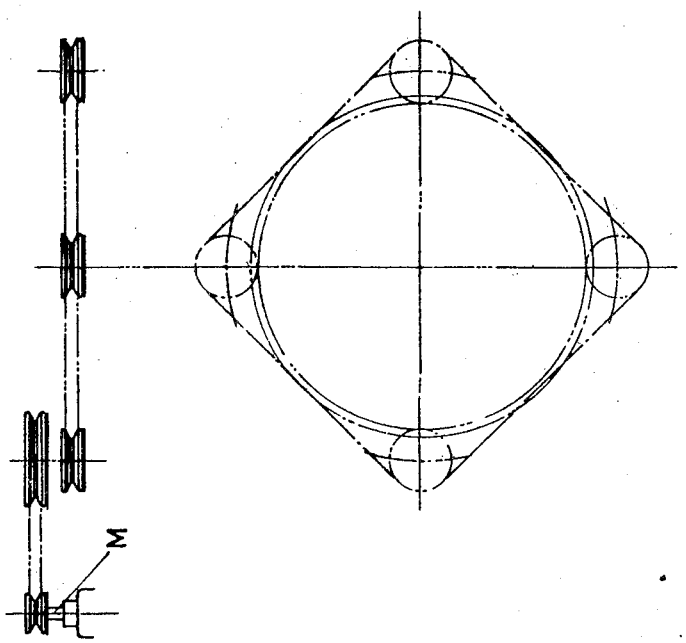

Figure 22 shows a further assembly of gears according to the present invention also diagrammatically in elevation and plan, and Figure 23 shows diagrammatically a further assembly of gears in elevation and plan in accordance with the present invention.

The method will now be described with the assistance of the accompanying drawings for obtaining the gearing of a reciprocal gear pair having the characteristics of the present invention.

Having chosen arbitrarily as diameter of the pitch circle of a pinion equal to 32 millimeters and supposing that a gear ratio of 1:8 has to be obtained, according to the known theory the diameter of the pitch circle of the driven gear wheel should be 32×8=256. I, on the contrary, reduce such diameter as follows and furthermore I establish the following data:

*Pinion.*—Inner diameter 24, diameter of pitch circle 32, outer diameter 38, three double-helical teeth, axial pitch of gear 19.05, axial pitch of helices 19.05×3=57.15.

*Wheel.*—Inner diameter 136, diameter of pitch circle 144, outer diameter 150, twenty-four double-helical teeth, axial pitch of gear 19.05, axial pitch of helices 19.05×24=457.20 (see Figure 1).

Therefore the inclination of the helices of the pinion, with regard to the outer circumference and to a plane perpendicular to the axis is given by:

$$\text{Ang. tan} \frac{57.15}{38 \times 3.1416} = 0.47872 = 25° \ 34' \ 52''$$

while the inclination of the helices of the wheel, also with regard to the outer circumference and to a plane perpendicular to the axis is:

$$\text{Ang. tan} \frac{457.20}{150 \times 3.1416} = 0.97020 = 44° \ 8'$$

As the axial pitch of the gears is 19.05, the normal pitch of the wheel is equal to 19.05 cos 44° 8'=13.67.

Having determined the above elements, Figure 2 can be drawn, which represents the partial plan view of two consecutive teeth of the wheel, in which the lines $yy$ and $xx$ represent the axes of the helices of the pinion and of the wheel, respectively, while the distance between the mid-lines of two teeth corresponds to the normal pitch, as determined previously, viz. is equal to 13.67.

The thickness of the fronts of the teeth will be determined below.

Furthermore, the projection of point $a$, Figure 1, on to the construction line NN, Figure 2, determines the points B, $n$, S, D, H.

Of course, if the axes of the helices were equally inclined, the points D and H would coincide and the profiles of the teeth could have been determined according to the known methods, but, in consideration of the substantial difference of inclination of said axes and, as a contact of the teeth is desired also in the point $a$, Figure 1, in the space comprises between the points $n$ and D Figure 2, one half of the thickness of the fronts of the teeth must be contained.

Therefore the space comprised between the points $n$ and D is determined in the following manner:

The axis of a helix of the pinion which originates at $d$ in Figure 1 and at $o''$ in Figure 2, by turning through the arc $d-a$ advances axially by the distance BD. It follows therefore that (Fig. 1)

$$\text{Ang. cos } aoo' = \frac{88^2 + 19^2 - 75^2}{2 \times 88 \times 19} = 0.74162 = 42° \ 7' \ 49''$$

If a helix, during a whole turn of the pinion advances axially by 57.15 when revolving through an angle of 42° 7' 49" it advances by $$\frac{57.15 \times 42° \ 7' \ 49''}{360°} = 6.68 = \text{stroke } BD$$

In like manner the axis of a helix of the wheel, which originates at $b$ in Figure 1 and also at $o''$ in Figure 2, advances axially by the distance BH.
Hence:

$$\text{Ang. cos } ao'o = \frac{75^2 + 88^2 - 19^2}{2 \times 75 \times 88} = 0.98454 = 9° \ 47' \ 8''$$

If a helix, during a whole turn of the wheel advances axially by 457.20 through an angle of 9°47'8" advances by $$\frac{457.20 \times 9° \ 47' \ 8''}{360°} = 12.42 = \text{stroke } BH$$

But (see Fig. 2)

$$nH = ro'' = \frac{19.05}{2} = 9.52$$

Hence $$Bn = BH - nH = 12.42 - 9.52 = 2.90$$

and $$nD = BD - Bn = 6.68 - 2.90 = 3.78$$

Therefore the thickness of the fronts of the teeth of the pinion will be made larger than the thickness of the fronts of the teeth of the wheel, as the teeth of the pinion accomplish also a greater work, hence:

3.78+0.22=4=thickness of the fronts of the pinion teeth, seen perpendicularly to a generatrix.

3.78−0.22=3.56=thickness of the fronts of the wheel teeth, seen perpendicularly to a generatrix.

The width of the spaces between the teeth of the wheel at the outer circumference, also seen perpendicularly to a generatrix and in the direction of arrow F, Figure 2, is equal to 19.05−3.56=15.49

Hence:

$$o''L = \frac{15.49}{2} = 7.74$$

Let us now divide the height of the teeth of the pinion into four parts spaced by 150 mm. from each other (see Figures 1 and 3); then let us drop through the intersection points 1, 2 and 3 of the arc $ab$ such a number of parallel lines to line $oo'o''$ as to intercept in Figure 2 the same lines that have been intercepted by the line $a$HDS$n$B. (In order not to jam the figures with a too large number of lines, for the necessary demonstration of the problem to be solved, only line 2 has been dropped, while the other lines have been described only.)

By the examination of Figures 2 and 3 it is seen at once that the thickness of the fronts of the teeth results to be 4 mm.; at the height 2 the thickness of the teeth is twice the distance between the points S and D, Figure 2, which is given by the projection of point 2, Figure 1.

It is apparent that the same may be said for the projection of points 1, 3 and $b$.

Hence, it is possible to determine the length of the segments SD, belonging, each, to said projections.

Let us begin with the projection of point 1:

The axis of the helix of the pinion originating at $d$ in Figure 1 and at $o''$ in Figure 2, during its path through the arc extended on the angle $1oo'$ advances axially by the distance BD (see Figure 1).

Hence:

$$\text{Ang. cos } 1oo' = \frac{88^2 + 17.50^2 - 75^2}{2 \times 88 \times 17.50} = 0.78741 = 38° \ 3' \ 21''$$

If a helix of the pinion advances axially during a whole turn by 57.15, by revolving through an angle of 38° 3' 21" it advances by $$\frac{57.15 \times 38° \ 3' \ 21''}{360°} = 6.04 = \text{stroke } BD$$

Likewise, the axis of a helix of the wheel, originating at $b$ in Figure 1 and also at $o''$ in Figure 2, during its rotation through the arc extended on the angle $1o'o$ advances axially by the distance BH.

Hence:

$$\text{Ang. cos } 1o'o = \frac{75^2 + 88^2 - 17.50^2}{2 \times 75 \times 88} = 0.98960 = 8° \ 16' \ 11''$$

If a helix of the wheel advances axially during a whole turn by 457.20, when it rotates through an angle of 8° 16′ 11″ it advances by $$\frac{457.20 \times 8° \ 16' \ 11''}{360°} = 10.50 = \text{stroke } BH$$

But $$SH = o''L = \frac{15.49}{2} = 7.74$$

hence:

$$BS = BH - SH = 10.50 - 7.74 = 2.76$$

and $$SD = BD - BS = 6.04 - 2.76 = 3.28$$

$3.28 \times 2 = 6.56 =$ thickness of the pinion teeth at the height 1, seen perpendicularly to a generatrix.

Let us now determine the thickness of the same teeth at the height 2, following truly the proceeding adopted for height 1:

$$\text{Ang. cos } 2oo' = \frac{88^2 + 16^2 - 75^2}{2 \times 88 \times 16} = 0.84339 = 32° \ 30'$$

$$\frac{57.15 \times 32° \ 30'}{360°} = 5.15 = \text{stroke } BD$$

Furthermore:

$$\text{Ang. cos } 2o'o = \frac{75^2 + 88^2 - 16^2}{2 \times 75 \times 88} = 0.99340 = 6° \ 35' \ 9''$$

$$\frac{457.20 \times 6° \ 35' \ 9''}{360°} = 8.36 = \text{stroke } BH$$

But $$SH = 7.74$$

hence $$BS = BH - SH = 8.36 - 7.74 = 0.62$$

and $$SD = BD - BS = 5.15 - 0.62 = 4.53$$

$4.53 \times 2 = 9.06 =$ thickness of the pinion teeth at the height 2, seen perpendicularly to a generatrix.

At the height 3

$$\text{Ang. cos } 3oo' = \frac{88^2 + 14.50^2 - 75^2}{2 \times 88 \times 14.50} = 0.91114 = 24° \ 20' \ 9''$$

$$\frac{57.15 \times 24° \ 20' \ 9''}{360°} = 3.86 = \text{stroke } BD$$

$$\text{Ang. cos } 3o'o = \frac{75^2 + 88^2 - 14.50^2}{2 \times 75 \times 88} = 0.99687 = 4° \ 32' \ 4''$$

$$\frac{457.20 \times 4° \ 32' \ 4''}{360°} = 5.75 = \text{stroke } BH$$

But $$SH = 7.74$$

Hence:

$$BS = SH - BH = 7.74 - 5.75 = 1.99$$

and $$SD = BD + BS = 3.86 + 1.99 = 5.85$$

$5.85 \times 2 = 11.70 =$ thickness of the pinion teeth at the height 3, seen perpendicularly to a generatrix.

And last, at the height $b$ the thickness of the teeth of the pinion, always seen perpendicularly to a generatrix, equals $o''L \times 2 = 7.74 \times 2 = 15.48$.

From the heights marked in Figure 3, it is seen that this figure represents a natural size drawing of two consecutive teeth of the pinion seen perpendicularly to a generatrix and from the calculations set out above it results that by means of teeth thus shaped, the contact is obtained between the wheel arc $a$—$b$ and the pinion teeth.

Of course, the same may be said of arc $b$—$c$.

Let us now determine the shapes of the spaces between the teeth and of the wheel teeth, by bearing in mind that the thickness of the front of the pinion teeth, seen perpendicularly to a generatrix, equals 4 mm.

Draw Figure 4, which is a partial reproduction of Figure 1, divide the height of the wheel teeth into 4 parts spaced 1.50 mm. from each other (see Figures 4 and 6) and determine on arc $a$—$d$ the points $a$, 1, 2, 3, $d$.

Draw for each of the said points a parallel to line $o$. $o'o''$ intercepting in Figure 5 the line $xx$ indicating the unknown slant of the imaginary axis of a space between two teeth of the wheel, in correspondence to the considered point of division, draw also the line $yy$, which is the axis of a pinion tooth related to the outer circumference and which, as said, is inclined by 25° 34′ 52″, draw the line AA representing the edge line of a pinion tooth and draw at last the construction line NN, thus determining the points $e$, $h$, $i$, $m$. The distance between the parallel lines AA—A′A′ represents the thickness of the front of the pinion teeth.

In order to avoid to jam the figures with lines, only the first and the second of said parallel lines have been drawn.

In order to render it easy to understand the proceeding which will be followed in order to determine the shape of the spaces of the wheel to the purpose of obtaining the contact also along the whole arc $adc$, I begin by attributing to line $xx$ the slant of the imaginary axis related to the outer circumference of the wheel which, as known, is equal to 44° 8′. In this manner it is seen at once in Figure 5, from the projection of the point $a$, Figure 4, that the distance between the points $i$ and $e$ along said projection equals exactly the distance $SH = o''L$ which corresponds to the projection of the point $a$ of Figure 1 on to Figure 2 and which, as said, when doubled, corresponds to the width of the wheel spaces, viz. to 15.49 related to the outer circumference and always seen perpendicularly to a generatrix. Of course the above is confirmed by calculations which have been omitted for the sake of brevity.

Thus in correspondence of point 1, Figure 4, the width of the spaces of the wheel will be twice $ie$ which results from the projection of point 1. Of course, the same argument is valid for the points 2, 3, $d$.

Let us now find the length of the stretch $ie$ relating to the projection of point 1:

$$\text{Ang. cos } 1oo' = \frac{88^2 + 19^2 - 73.50^2}{2 \times 88 \times 19} = 0.80823 = 36° \ 4' \ 35''$$

$$\frac{57.15 \times 36° \ 4' \ 35''}{360°} = 5.72 = \text{stroke } nh$$

$$\text{Ang. cos } 1o'o = \frac{73.50^2 + 88^2 - 19^2}{2 \times 73.50 \times 88} = 0.98834 = 8° \ 45' \ 27''$$

$$\frac{457.20 \times 8° \ 45' \ 27''}{360°} = 11.12 = \text{stroke } ne$$

But $$he = ne - nh = 11.12 - 5.72 = 5.40$$

$$hi = o''R = \frac{4}{2} = 2$$

hence:
$$ie = hi + he = 2 + 5.40 = 7.40$$

$7.40 \times 2 = 14.80 =$ width of the spaces between the wheel teeth at the depth corresponding to point 1, seen perpendicularly to a generatrix.

At point 2, is:

$$\text{Ang. cos } 2oo' = \frac{88^2 + 19^2 - 72^2}{2 \times 88 \times 19} = 0.87350 = 29° 7' 57''$$

$$\frac{57.15 \times 29° 7' 57''}{360°} = 4.62 = \text{stroke } nh$$

$$\text{Ang. cos } 2o'o = \frac{72^2 + 88^2 - 19^2}{2 \times 72 \times 88} = 0.99171 = 7° 22' 53''$$

$$\frac{457.20 \times 7° 22' 53''}{360°} = 9.37 = \text{stroke } ne$$

But
$$he = ne - nh = 9.37 - 4.62 = 4.75$$
$$hi = o''R = 2$$

hence:
$$ie = hi + he = 2 + 4.75 = 6.75$$

$6.75 \times 2 = 13.50 =$ width of the spaces of the wheel at the depth corresponding to point 2, seen perpendicularly to a generatrix.

At point 3:

$$\text{Ang. cos } 3oo' = \frac{88^2 + 19^2 - 70.50^2}{2 \times 88 \times 19} = 0.93742 = 20° 22' 38''$$

$$\frac{57.15 \times 20° 22' 38''}{360°} = 3.23 = \text{stroke } nh$$

$$\text{Ang. cos } 3o'o = \frac{70.50^2 + 88^2 - 19^2}{2 \times 70.50 \times 88} = 0.99558 = 5° 23' 19''$$

$$\frac{457.20 \times 5° 23' 19''}{360°} = 6.84 = \text{stroke } ne$$

But
$$he = ne - nh = 6.84 - 3.23 = 3.61$$
$$hi = o''R = 2$$

hence
$$ie = hi + he = 2 + 3.61 = 5.61$$

$5.61 \times 2 = 11.22 =$ width of the wheel spaces at the depth corresponding to point 3, seen perpendicularly to a generatrix.

And, lastly at the point $d$ the width of the wheel spaces always seen perpendicularly to a generatrix, equals, of course, $o''R \times 2 = 2 \times 2 = 4$.

It is to be remarked that the teeth of the wheel in Figure 6 are drawn by taking into account the above determined width of the spaces at the corresponding heights and by means of these teeth the contact is obtained between said teeth and the arc $ad$, Figure 1, belonging to the pinion. Symmetrically, the same takes place for the arc $dc$.

Now it is to be noted that the profiles of the pinion teeth shown in Figure 3, as well as the profiles of the wheel teeth shown in Figure 6 are concave. Now it is just the concavity that limits the contact between the arcs $abc$ and $cha$ only. And the precise purpose of the present invention resides, among others, in that the said contact is extended also for a very high percentage of the surface comprised between the said arcs, thus very largely reducing the unit pressure.

In order to attain the above result, proceed as follows: Determine the radius of the arc uniting the three points of intersection of the profile of the wheel space with lines 1, 2 and 3. By means of this radius modify the profile of the pinion teeth, Figure 3, from the thickness of about 9.06 to the face, by proceeding so that the thickness of the face is as large as possible without increasing, on the other hand, the thickness above the face up to height 9.06. It is apparent that in this manner the pinion teeth remain in contact with almost the whole surface comprised in that portion of annulus defined by the radii $oa$ and $o2$, Figure 1, in addition to the remaining contact along the stretch of arc 2, $b$, $c$. When this modification is effected, the profile assumes the form as shown in Figure 7.

Afterwards, determine the arc of the radius connecting the three points of intersection of the profile of the space between the pinion teeth, Figure 3, with lines 1, 2 and 3. By means of the same radius modify the profile of the wheel teeth, Figure 6, by proceeding exactly in like manner as for the pinion teeth, to start with height 5.55 approximately, and as result, the profile assumes the shape shown in Figure 8. It is apparent that also in this case the contact is extended for almost the whole part of annulus defined by radii $o'a$, $o'2$, Figure 4, in addition to the contact left on the arc stretch 2, $d$, $c$. Then complete Figures 7 and 8 by beveling the edges for a suitable height, to the purpose of better widening the contact surface.

Of course, it is apparent that, due to the modifications introduced according to Figures 7 and 8, the centres of the two gears must be brought nearer together by few tenths of a millimeter and it is for this reason that the free space between the roots of the teeth amounts to 1 mm. while the half of this amount would be sufficient.

By means of the asserted widening of the contact surface, that has been found out after years of practical experiments, we have succeeded in constructing step-down gearings which have been found to be very useful for the industry, as they fully satisfy the objects set out in the opening paragraphs of this specification.

As, however, the teeth have been shown perpendicularly to a generator while for the working thereof it is necessary to draw the views at right angles to the respective helices, in order to complete this specification, in order to obtain said views at right angles to the helices it is sufficient to multiply the quotas marked in Figures 7 and 8 by the cosines of the angles formed by the respective helices, and substitute the results.

A numerical example of the manner how to proceed is shown in Figure 2, in which, starting from quota 19.05 at right angles to a generator, the quota 13.67 at right angles to the helices has been found.

A description of an irreversible gear pair with parallel axes, will now be described.

Irreversible gears of the above kind show the following characteristic features:

1. Generally they are double-helical gears, but they might be also single helical.

2. The diameters of the driven gears are substantially smaller than they ought to be with respect to the respective velocity ratios, but the axial pitches of both gears (but not of the helices) are equal and therefore the angles at the apex are unlike, approximately as set out above for the reciprocal gears.

3. The shape of the teeth must be very trapezoidal, inclined as much as possible at about 45°.

4. The contact between the teeth must take place at the same time and continuously along the whole line $nr$, Figure 9.

5. The same line $nr$ must be inclined by approximately 18° with respect to the axes.

An irreversible gear pair that has been practically constructed and which well satisfies all exigencies, shows the following dimensions:

*Pinion.*—Inner diameter 32.60, pitch diameter 38, outer diameter 41.60, a single double-helical tooth, axial pitch 12.70.

*Wheel.*—Inner diameter 218.60, pitch diameter 224, outer diameter 227.60, 20 double-helical teeth, axial pitch of the helices 12.70×20=254. Velocity ratio 1:20, viz. just the ratio between the number of teeth. Distance between the centres 131.

From the above data it is seen (see Figure 9) that the height of the teeth which take part to the driving is 3.60 and that there is a play at the bottom of the spaces of 0.90.

Therefore the inclination of the helices of the pinion related to the inner diameter increased by the said play and with regards to a plane at right angles to the axis is given by:

$$\text{Ang. tan } \frac{12.70}{32.60+2\times 0.90}=0.11751=6°\ 42'\ 7''$$

while the inclination of the helices of the wheel, with respect to the outer circumference and also related to the plane at right angles to the axis is $$\text{Ang. tan } \frac{254}{227.60\times 3.1416}=0.35523=19°\ 33'\ 22''$$

As the axial pitch of the gears is 12.70, the normal pitch of the wheel is equal to $12.70 \cos 19°\ 33'\ 22''=11.96$.

By means of the above data, Figure 10 might be drawn, which represents a partial plan view of two consecutive teeth of the wheel, in which the lines $yy$ and $xx$ are the axes of the helices of the pinion and of the wheel, respectively, while the distance between the midlines of the two teeth corresponds to the above determined normal pitch, viz. to 11.96.

Let us now determine the thickness of the teeth fronts:

Having drawn two consecutive teeth of the wheel, Figure 11, seen in elevation and at right angles to the helices, in which we know that the normal pitch equals 11.96, in order to satisfy to the condition 3) must be the angle $abc=45°$. Then the thickness of the fronts of the wheel teeth and that of the fronts of the pinion teeth which, as known, penetrate into the spaces between the teeth up to the depth of 3.60 are:

$$11.96-\frac{(3.60\times \tan 45°\times 2)}{2}=\frac{11.96-7.20}{2}=2.38$$

As however the thickness of the teeth fronts must be obviously greater than that of the wheel teeth, let us reduce this latter to 2.16 mm. Therefore the width of the wheel spaces at the outer circumference, seen perpendicularly to the helices, is:

$$11.96-2.16=9.80$$

while the width of the same spaces, likewise at the outer circumference, but seen at right angles to a generator, is:

$$\frac{9.80}{\cos 19°\ 33'\ 22''}=10.39$$

Hence $$o''L=\frac{10.39}{2}=5.19 \text{ (see Figure 10)}$$

[It is to be noted that from the graph it results that the contact line $nr$, Figure 1, is long about 3 mm. so that at the point $r$, Figure 1, the thickness of the pinion teeth is given by (see Figure 11):

[$3 \times \tan 45°\times 2=6$, to which the thickness of the front of the pinion teeth must be added, corresponding to $2.38+(2.38-2.16)=2.60$.

[Consequently at the point $r$ the thickness of the pinion teeth is $6+2.60=8.60$.

[Draw in Figure 10 a parallel to line $yy$ at a distance from this latter of $$\frac{8.60}{2}$$

this line intersects the edge of the gear teeth at point $a$ which, graphically, results at a distance of little less than 4 mm. from the plane of the axes. From said point $a$ draw a parallel to line $o''$, $o'$, $o$ so as to determine the points $a$, $h$, $e$; $i$ in Figure 10 and the point $r$ in Figure 9.]

All data reported between the above square parentheses are approximate. The same have been useful only for determining that point $r$, Figure 1, comes to be approximately at a distance of about 4 mm. from the plane of the axes, as aforesaid, but this distance must be determined with mathematical precision, together with the remaining quotas. For this reason let us determine first the heights and the corresponding thicknesses that the teeth should possess in order to obtain the contact also at the right and left of the point $r$, at the arbitrary distances given below, then by suitably shaping their profile, we shall reduce the contact to a single point.

This may be done as follows:

Before all, it is to be pointed out that my research consists in finding mathematically the length of the line $ae$, Figure 10, which, as it is apparent, when doubled gives us the thickness which the pinion teeth possess in order to obtain the contact at that point $r$, which results from the projection of the point $a$ in Figure 9.

Then let us drop a perpendicular from point $r$, which is being considered, on to line $oo'$ and I obtain the chord half $rz$. Furthermore, imagine that an arbitrary number of other chord halves originating at $r$, be dropped always on to the outer circumference of the wheel and be drawn at the following distances from the plane of the axes: 4.60, 4.30, 4, 3.70, 3.40, 3.10 and 2.80.

At the point $r$, which lies at a distance of 4.60 from the plane of the axes:

$$o'z=\sqrt{113.80^2-4.60^2}=113.706$$

$$oz=131-113.706=17.294$$

$$or=\sqrt{17.294^2+4.60^2}=17.895$$

By subtracting from the outer radius of the pinion the above determined value of $or$, the height of the pinion tooth at the point $r$ is obtained, viz:

$$20.80-17.895=2.905$$

It is apparent that, in order to obtain a contact, half the thickness belonging to said point $r$ corresponds to the length of line $ae$, Figure 10, which is determined as follows:

The helix of a pinion tooth originating in the plane of the axes $e$ with radius $o'r$, on the path of the arc subtended to angle $ro'z$ advances axially by the distance $hi$.

Now the length of $he$ and $hi$ are determined as follows:

$$\text{Ang. sin } roz=\frac{4.60}{17.895}=0.25705=14°\ 53'\ 42''$$

If the helix of a pinion tooth advances axially in a whole turn by 12.70, it advances through 14° 53′ 42″ by:

$$\frac{12.70 \times 14° 53' 42''}{360°} = 0.525 = \text{stroke } he$$

Then $$\text{Ang. sin } zo'r = \frac{4.60}{113.80} = 0.04042 = 2° 19'$$

If the fictitious helix of a wheel space advances axially during a whole turn by 254, it advances through 2° 19′ by:

$$\frac{254 \times 2° 19'}{360°} = 1.634 = \text{stroke } hi$$

But (see Figure 10)

$$ai = o''L = 5.19$$

Hence:

$$ah = ai - hi = 5.19 - 1.634 = 3.556$$

and $$ae = ah + he = 3.556 + 0.525 = 4.081$$

$4.081 \times 2 = 8.162 =$ thickness, seen perpendicularly to a generatrix, that the teeth have at the height 2.905 in order to obtain the contact of the point $r$ lying at a distance of 4.60 from the plane of the axes.

The above proceeding will be truly followed for the determination of the heights and of the corresponding thicknesses that the pinion teeth ought to have in order to obtain the contact in the other points $r$ that lie, as said, at distances of 4.30, 4, 3.70, 3.40, 3.10 and 2.80 from the plane of the axes.

In the course of the development, we will however omit the specification, as this would lead to repetition of ideas already set out, and will execute the calculations only.

Therefore:

At the point $r$, lying at a distance 4.30 from the plane of the axes:

$$o'z = \sqrt{113.80^2 - 4.30^2} = 113.718$$
$$oz = 131 - 113.718 = 17.282$$
$$or = \sqrt{17.282^2 + 4.30^2} = 17.808$$
$$20.80 - 17.808 = 2.992 = \text{height of the teeth}$$

Furthermore:

$$\text{Ang. sin } roz = \frac{4.30}{17.808} = 0.24146 = 13° 58' 21''$$

hence $$\frac{12.70 \times 13° 58' 21''}{360°} = 0.492 = \text{stroke } he$$

Then:

$$\text{Ang. sin } ro'z = \frac{4.30}{113.80} = 0.03778 = 2° 9' 53''$$

it follows:

$$\frac{254 \times 2° 9' 53''}{360°} = 1.527 = \text{stroke } hi$$

But $$ai = o''L = 5.19$$

hence $$ah = ai - hi = 5.19 - 1.527 = 3.663$$

and $$ae = ah + he = 3.663 + 0.492 = 4.155$$

$4.155 \times 2 = 8.310 =$ thickness, seen at right angles to a generatrix, that the pinion teeth ought to have at the height 2.992 in order to obtain the contact at the point $r$ lying at a distance of 4.30 from the plane of the axes.

At the point $r$, lying at distance of 4 mm. from the plane of the axes:

$$o'z = \sqrt{113.80^2 - 4^2} = 113.729$$
$$oz = 131 - 113.729 = 17.271$$
$$or = \sqrt{17.271^2 + 4^2} = 17.728$$
$$20.80 - 17.728 = 3.072 = \text{height of the teeth}$$

Furthermore:

$$\text{Ang. sin } roz = \frac{4}{17.728} = 0.22563 = 13° 2' 24''$$

hence $$\frac{12.70 \times 13° 2' 24''}{360°} = 0.460 = \text{stroke } he$$

Then:

$$\text{Ang. sin } ro'z = \frac{4}{113.80} = 0.03514 = 2° 49'$$

it follows:

$$\frac{254 \times 2° 49'}{360°} = 1.420 = \text{stroke } hi$$

But $$ai = o''L = 5.19$$

hence $$ah = ai - hi = 5.19 - 1.420 = 3.770$$

and $$ae = ah + he = 3.770 + 0.460 = 4.230$$

$4.230 \times 2 = 8.460 =$ thickness, seen at right angles to a generatrix, that the pinion teeth ought to have at the height 3.072 in order to obtain the contact at the point $r$ lying at a distance of 4 mm. from the plane of the axes.

At the point $r$, lying at a distance of 3.70 from the plane of the axes:

$$o'z = \sqrt{113.80^2 - 3.70^2} = 113.739$$
$$oz = 131 - 113.739 = 17.261$$
$$or = \sqrt{17.261^2 + 3.70^2} = 17.653$$
$$20.80 - 17.653 = 3.147 = \text{height of the teeth}$$

Furthermore:

$$\text{Ang. sin } roz = \frac{3.70}{17.653} = 0.20959 = 12° 5' 53''$$

hence $$\frac{12.70 \times 12° 5' 53''}{360°} = 0.426 = \text{stroke } he$$

Then:

$$\text{Ang. sin } ro'z = \frac{3.70}{113.80} = 0.03251 = 1° 51' 46''$$

it follows:

$$\frac{254 \times 1° 51' 46''}{360°} = 1.314 = \text{stroke } hi$$

But $$ai = o''L = 5.19$$

hence:

$$ah = ai - hi = 5.19 - 1.314 = 3.876$$

and $$ae = ah + he = 3.876 + 0.426 = 4.302$$

$4.302 \times 2 = 8.604 =$ thickness, seen at right angles to a generatrix, that the pinion teeth ought to have at the height 3.147 in order to obtain the contact of point $r$ lying at a distance of 3.70 from the plane of the axes.

At the point $r$, lying at a distance of 3.40 from the plane of the axes:

$$o'z = \sqrt{113.80^2 - 3.40^2} = 113.749$$
$$oz = 131 - 113.749 = 17.251$$
$$or = \sqrt{17.251^2 + 3.40^2} = 17.582$$

$20.80 - 17.582 = 3.218 =$ height of the teeth

Furthermore:

$$\text{Ang. sin } roz = \frac{3.40}{17.582} = 0.19337 = 11° \; 8' \; 58''$$

hence:

$$\frac{12.70 \times 11° \; 8' \; 58''}{360°} = 0.393 = \text{stroke } he$$

Then:

$$\text{Ang. sin } ro'z = \frac{3.40}{113.80} = 0.02987 = 1° \; 42' \; 42''$$

it follows:

$$\frac{254 \times 1° \; 42' \; 42''}{360°} = 1.207 = \text{stroke } hi$$

But
$$ai = o''L = 5.19$$
hence:
$$ah = ai - hi = 5.19 - 1.207 = 3.983$$
and
$$ae = ah + he = 3.983 + 0.393 = 4.376$$

$4.376 \times 2 = 8.752 =$ thickness, seen at right angles to a generatrix, that the pinion teeth ought to have at the height 3.218 in order to obtain the contact of point $r$ lying at a distance of 3.40 from the plane of the axes.

At the point $r$, lying at a distance 3.10 from the plane of the axes:

$$o'z = \sqrt{113.80^2 - 3.10^2} = 113.757$$
$$oz = 131 - 113.757 = 17.243$$
$$or = \sqrt{17.243^2 + 3.10^2} = 17.519$$

$20.80 - 17.519 = 3.281 =$ height of the teeth

Furthermore:

$$\text{Ang. sin } roz = \frac{3.10}{17.519} = 0.176695 = 10° \; 11' \; 31''$$

hence $$\frac{12.70 \times 10° \; 11' \; 31''}{360°} = 0.359 = \text{stroke } he$$

Then:

$$\text{Ang. sin } ro'z = \frac{3.10}{113.80} = 0.02724 = 1° \; 33' \; 39''$$

it follows:

$$\frac{254 \times 1° \; 33' \; 39''}{360°} = 1.101 = \text{stroke } hi$$

But
$$ai = o''L = 5.19$$
hence
$$ah = ai - hi = 5.19 - 1.101 = 4.089$$
and
$$ae = ah + he = 4.089 + 0.359 = 4.448$$

$4.448 \times 2 = 8.896 =$ thickness, seen at right angles to a generatrix, that the pinion teeth ought to have at the height 3.281 in order to obtain the contact at the point $r$ lying at a distance of 3.10 from the plane of the axes.

At the point $r$, lying at a distance of 2.80 from the plane of the axes:

$$o'z = \sqrt{113.80^2 - 2.80^2} = 113.765$$
$$oz = 131 - 113.765 = 17.235$$
$$or = \sqrt{17.235^2 + 2.80^2} = 17.460$$

$20.80 - 17.460 = 3.340 =$ height of the teeth

Furthermore:

$$\text{Ang. sin } roz = \frac{2.80}{17.460} = 0.16036 = 9° \; 13' \; 39''$$

hence:

$$\frac{12.70 \times 9° \; 13' \; 39''}{360°} = 0.325 = \text{stroke } he$$

Then:

$$\text{Ang. sin } ro'z = \frac{2.80}{113.80} = 0.02460 = 1° \; 24' \; 34''$$

it follows:

$$\frac{254 \times 1° \; 24' \; 34''}{360°} = 0.994 = \text{stroke } hi$$

But
$$ai = o''L = 5.19$$
hence
$$ah = ai - hi = 5.19 - 0.994 = 4.196$$
and
$$ae = ah + he = 4.196 + 0.325 = 4.521$$

$4.521 \times 2 = 9.042 =$ thickness, seen at right angles to a generatrix, that the pinion teeth ought to have at the height 3.340 in order to obtain the contact of point $r$ lying at a distance of 2.80 from the plane of the axes.

Now, let us draw the figure of a pinion tooth, Figure 12, always seen at right angles to a generatrix by taking into account the height and the thickness thereof at the point $r$ lying at a distance of 3.70 from the plane of the axes, in order that the contact is obtained at that point. In fact in said figure, the data 3.147 and 8.604 are found, which have been found above just at the point $r$ lying at a distance of 3.70 from the plane of the axes. Furthermore, by making the thickness of the tooth front equal to 2.32, the inclination of the profile is such as to exclude the contact at the right and left of said point $r$. Let us see why:

Let us first point out that (Figure 12)

$$\text{Ang. tan } acb = \frac{\frac{1}{2}8.604 - \frac{1}{2}2.32}{3.147} = 0.99841 = 44° \; 57' \; 15''$$

Then, by setting up the following table, the enunciation results analytically, because distances 4.60, 4.30, 4, 3.70, 3.40, 3.10, and 2.80, from the plane of the axes, are as follows:

At 4.60—2.32+(2.905×0.99841×2)=8.120<8.162 by 0.042
At 4.30—2.32+(2.992×0.99841×2)=8.294<8.310 by 0.016
At 4    —2.32+(3.072×0.99841×2)=8.454<8.460 by 0.006
At 3.70—2.32+(3.147×0.99841×2)= Figure 12
At 3.40—2.32+(3.218×0.99841×2)=8.745<8.752 by 0.007
At 3.10—2.32+(3.281×0.99841×2)=8.870<8.896 by 0.026
At 2.80—2.32+(3.340×0.99841×2)=8.988<9.042 by 0.054
      2.32+(4.50 ×0.99841×2)=11.30

By examining the above table, beginning at the bottom line thereof, and from consideration of that line, it is found the method which has been adopted determines the thickness of the tooth at the maximum height.

In the second line from the bottom of the table, the results determine that the tooth at the height 3.340 has a thickness of 8.988, while, in order to obtain the contact at the point $r$ lying at a distance of 2.80 from the plane of the axes, such thickness should have been 9.042, just as it has been demonstrated above, and therefore there is a difference of 0.054.

In the third line from the bottom, the results determine that at the point $r$, lying at a distance 3.10 from the plane of the axes, there is no contact due to a difference of 0.026.

In the fourth line from the bottom, in which the results determine, point $r$ being at 3.40 from the plane of the axes, there is no contact due to a difference of 0.007.

It is apparent that in the fifth line from the bottom of the table, the thickness of the tooth is equal to that indicated in Figure 7 and therefore there is contact at the point $r$ lying at a distance 3.70 from the plane of the axes.

Finally, at the points indicated in the sixth, seventh and eighth lines from the bottom of the table, there is no contact, due to differences of 0.006, 0.016 and 0.042 respectively.

Consequently I have shown the manner how the shape of the pinion teeth should be determined and have also demonstrated that by means of such teeth it is possible to obtain the contact with the front edges of the wheel only at the point $r$, lying at a distance of 3.70 from the plane of the axes.

It is apparent that the shape of the spaces can be determined easily by following the proceeding which has been adopted for the pinion of the reciprocal gear pair already mentioned.

Now let us first determine how the shape of the teeth of wheel $e$ is determined and then how the contact is obtained along the whole line $nr$, Figure 9.

Draw Figure 13, which is a reproduction of Figure 9, join the point $n$ with the gear centres and from the same point $n$ drop a perpendicular to line $oo'$, thus determining the chord half $nv$.

Figure 14 is a diagrammatic plan view of a part of Figure 13, in which there are indicated: the axis $yy$ of a pinion tooth, which is inclined following the slant of the helix resulting from the outer circumference and the thickness of the front of the same tooth bounded by the lines EE, E'E' (said front is drawn in Figure 14 on a double scale); the imaginary axis $xx$ of a wheel space, referred to the inclination of the helix at the outer circumference and the width of the same space bounded by the lines AA, A'A', as well as the projection of the point $n$ on the axis $xx$, on the axis $yy$, on the construction line NN, on the front edge of the pinion tooth indicated by line EE and on the front edge of a wheel tooth indicated by the line AA, thus determining the points $i, e, h, a, B$.

Due to the fact that the contact between the teeth must take place along the whole line $nr$, Figure 13, let us determine first the width of the wheel spaces, in order to obtain the contact only in the point $n$ and afterwards proceed to determine the other points.

It is to be noted that the point $n$, which comes to be on the front edge of the pinion teeth, in the plan view shown in Figure 14, falls on the same front edge at the point $a$. Therefore, in order that at that point there is a contact, the wheel spaces must have a width that is equal to the distance of the points $a$ and $i$, multiplied by 2.

Let us now bear in mind the condition, 5 above and, by satisfying the same, it results that the point $n$ comes to be at a distance of about 5 mm. from the plane of the axes. But such a distance must be determined with mathematical precision, which precision is obtained by determining first the various widths which the spaces ought to have in order to obtain the contact even at the right and the left of the point $n$, at the arbitrary distances mentioned below and then, by suitably shaping the spaces, the contact will be reduced to a single point $n$.

Be said distances the following ones: 5.70, 5.40, 5.10, 4.80, 4.50, 4.20 and 3.90.

At the point $n$, which lies at a distance 5.70 from the plane of the axes, is (Figure 13):

$$ov = \sqrt{20.80^2 - 5.70^2} = 20.003$$

$$o'v = 131 - 20.003 = 110.997$$

$$o'n = \sqrt{110.997^2 + 6.70^2} = 111.143$$

By subtracting from the outer radius of the wheel the above determined value of $o'n$, the depth of the wheel spaces at the point $n$ lying at a distance of 5.70 from the plane of the axes, is obtained, viz:

$$113.80 - 111.143 = 2.657$$

It is to be noted that the helix which corresponds to the outer circumference of the pinion and which originates in the plane of the axes, which is indicated in Figure 14 by the point $o''$, during the angular shifting by the arc subtended to the angle $nov$ advances axially by the distance $he$.

At the same time the helix corresponding to the radius $o'n$ of the wheel, and which originates also in $o''$ in the plane of the axes $e$, Figure 14, during the angular shifting by the arc subtended to the angle $no''v$ advances axially by $hi$.

Let us now determine the lengths of said distances in the following manner:

$$\text{Ang. sin } nov = \frac{5.70}{20.80} = 0.27403 = 15° 54' 15''$$

If the helix of a pinion tooth advances axially during a whole turn by 12.70 it advances through 15° 54' 15'' by $$\frac{12.70 \times 15° 54' 15''}{360°} = 0.561 = \text{stroke } he$$

Then:

$$\text{Ang. sin } no'v = \frac{5.70}{111.143} = 0.05128 = 2° 56' 21''$$

If the helix of a wheel tooth advances axially during a whole turn by 254, it advances through 2° 56' 21'' by $$\frac{254 \times 2° 56' 21''}{360°} = 2.073 = \text{distance } hi$$

But $$ei = hi \quad he = 2.073 - 0.561 = 1.512$$

$$ae = o''R = \frac{2.32}{2} = 1.16$$

hence $$ai = ae \quad ei = 1.16 + 1.512 = 2.672$$

$2.672 \times 2 = 5.344 =$ width, seen at right angles to a generatrix, that the wheel spaces ought to have at the depth 2.657, in order to obtain the contact at the point $n$ lying at a distance of 5.70 from the plane of the axes.

At the point $n$, lying at a distance of 5.40 from the plane of the axes, is:

$$ov = \sqrt{20.80^2 - 5.40^2} = 20.086$$

$$o'v = 131 - 20.086 = 110.914$$

$$o'n = \sqrt{110.914^2 + 5.40^2} = 111.045$$

$113.80 - 111.045 = 2.755 =$ depth of the spaces

Furthermore:

$$\text{Ang. sin } nov \frac{5.40}{20.80} = 0.25961 = 15° \, 2' \, 48''$$

hence $$\frac{12.70 \times 15° \, 2' \, 48''}{360°} = 0.53 = \text{distance } he$$

Then:

$$\text{Ang. sin } no'v = \frac{5.40}{111.045} = 0.04862 = 2° \, 47' \, 12''$$

It follows:

$$\frac{254 \times 2° \, 47' \, 12''}{360°} = 1.966 = \text{stroke } hi$$

But $$ei = hi - he = 1.966 - 0.53 = 1.436$$
$$ae = 1.16$$

hence $$ai = ae + ei = 1.16 + 1.436 = 2.596$$

$2.596 \times 2 = 5.192 =$ width, seen at right angles to a generatrix, that the wheel spaces ought to have at the depth 2.755, in order to obtain the contact at the point $n$ lying at a distance of 5.40 from the plane of the axes.

At the point $n$, lying at a distance of 5.10 from the plane of the axes is:

$$ov = \sqrt{20.80^2 - 5.10^2} = 20.165$$

$$o'v = 131 - 20.165 = 110.835$$

$$o'n = \sqrt{110.835^2 + 5.10^2} = 110.952$$

$113.80 - 110.952 = 2.848 =$ depth of the spaces

Furthermore:

$$\text{Ang. sin } nov = \frac{5.10}{20.80} = 0.24519 = 14° \, 11' \, 35''$$

hence:

$$\frac{12.70 \times 14° \, 11' \, 35''}{360°} = 0.50 = \text{stroke } he$$

Then:

$$\text{Ang. sin } no'v = \frac{5.10}{110.952} = 0.04596 = 2° \, 38' \, 2''$$

It follows:

$$\frac{254 \times 2° \, 38' \, 2''}{360°} = 1.858 = \text{stroke } hi$$

But $$ei = hi - he = 1.858 - 0.50 = 1.358$$
$$ae = 1.16$$

hence $$ai = ae + ei = 1.16 + 1.358 = 2.518$$

$2.518 \times 2 = 5.036 =$ width, seen at right angles to a generatrix, that the wheel spaces ought to have at the depth 2.848 in order to obtain the contact at the point $n$ lying at a distance of 5.10 from the plane of the axes.

At the point $n$ lying at a distance 4.80 from the plane of the axes, is:

$$ov = \sqrt{20.80^2 - 4.80^2} = 20.238$$

$$o'v = 131 - 20.838 = 110\,762$$

$$o'n = \sqrt{110.762^2 + 4.80^2} = 110.865$$

$113.80 - 110.865 = 2.935 =$ depth of the spaces

Furthermore:

$$\text{Ang. sin } nov = \frac{4.80}{20.80} = 0.23076 = 13° \, 20' \, 29''$$

hence $$\frac{12.70 \times 13° \, 20' \, 29''}{360°} = 0.47 = \text{stroke } he$$

Then:

$$\text{Ang. sin } no'v = \frac{4.80}{110.865} = 0.04329 = 2° \, 28' \, 51''$$

hence $$\frac{254 \times 2° \, 28' \, 51''}{360°} = 1.75 = \text{stroke } hi$$

But $$ei = hi - he = 1.75 - 0.47 = 1.28$$
$$ae = 1.16$$

hence $$ai = ae + ei = 1.16 + 1.28 = 2.44$$

$2.44 \times 2 = 4.88 =$ width, seen at right angles to a generatrix, that the wheel spaces ought to have at the depth 2.395 in order to obtain the contact at the point $n$ lying at a distance of 4.80 from the plane of the axes.

At the point $n$ lying at a distance of 4.50 from the plane of the axes is:

$$ov = \sqrt{20.80^2 - 4.50^2} = 20.307$$

$$o'v = 131 - 20.307 = 110.693$$

$$o'n = \sqrt{110.693^2 + 4.50^2} = 110.784$$

$113.80 - 110.784 = 3.016 =$ depth of the spaces

Furthermore:

$$\text{Ang. sin } nov = \frac{4.50}{20.80} = 0.21634 = 12° \, 29' \, 38''$$

Hence $$\frac{12.70 \times 12° \, 29' \, 38''}{360°} = 0.44 = \text{stroke } he$$

Then:

$$\text{Ang. sin } no'v = \frac{4.50}{110.784} = 0.04061 = 2° \, 19' \, 39''$$

It follows:

$$\frac{254 \times 2° \, 19' \, 39''}{360°} = 1.644 = \text{stroke } hi$$

But $$ei = ih - he = 1.644 - 0.44 = 1.204$$
$$ae = 1.16$$

hence $$ai = ae + ei = 1.16 + 1.204 = 2.364$$

$2.364 \times 2 = 4.728 =$ width, seen at right angles to a generatrix, that the wheel spaces ought to have at the depth 3.016 in order to obtain the contact at the point $n$ lying at a distance of 4.50 from the plane of the axes.

At the point $n$ lying at a distance of 4.20 from the plane of the axes, is:

$$ov = \sqrt{20.80^2 - 4.20^2} = 20.371$$

$$o'v = 131 - 20.371 = 110.629$$

$$o'n = \sqrt{110.629^2 + 4.20^2} = 110.708$$

$113.80 - 110.708 = 3.092 =$ depth of the spaces

Furthermore:

$$\text{Ang. sin } nov = \frac{4.20}{20.80} = 0.20192 = 11° \, 38' \, 56''$$

hence $$\frac{12.70 \times 11° \, 38' \, 56''}{360°} = 0.41 = \text{stroke } he$$

Then:

$$\text{Ang. sin } no'v = \frac{4.20}{110.708} = 0.03793 = 2° \ 10' \ 24''$$

It follows:

$$\frac{254 \times 2° \ 10' \ 24''}{360°} = 1.533 = \text{stroke } hi$$

But $$ei = hi - he = 1.533 - 0.41 = 1.123$$
$$ae = 1.16$$

hence $$ai = ae + ei = 1.16 + 1.123 = 2.283$$

$2.283 \times 2 = 4.566 =$ width, seen at right angles to a generatrix, that the wheel spaces must have at the depth 3.092 in order to obtain the contact at the point $n$ lying at a distance of 4.20 from the plane of the axes.

At the point $n$, lying at a distance 3.90 from the plane of the axes, is:

$$ov = \sqrt{20.80^2 - 3.90^2} = 20.431$$

$$o'v = 131 - 20.431 = 110.569$$

$$o'n = \sqrt{110.569^2 + 3.90^2} = 110.637$$

$113.80 - 110.637 = 3.163 =$ depth of the spaces

Furthermore:

$$\text{Ang. sin } nov = \frac{3.90}{20.80} = 0.18750 = 10° \ 48' \ 25''$$

Then:

$$\frac{12.70 \times 10° \ 48' \ 25''}{360°} = 0.381 = \text{stroke } he$$

Then:

$$\text{Ang. sin } no'v = \frac{3.90}{110.637} = 0.03525 = 2° \ 1' \ 12''$$

it follows:

$$\frac{254 \times 2° \ 1' \ 12''}{360°} = 1.425 = \text{stroke } hi$$

But $$ei = hi - he = 1.425 - 0.381 = 1.044$$
$$ae = 1.16$$

hence $$ai = ae + ei = 1.16 + 1.044 = 2.204$$

$2.204 \times 2 = 4.408 =$ width, seen at right angles to a generatrix, that the wheel spaces ought to have at the depth 3.163 in order to obtain the contact at the point $n$ lying at a distance of 3.90 from the plane of the axes.

Now it must be borne in mind that the width of the wheel spaces at the outer circumference, seen at right angles to a generatrix, equals 10.39 (see Figures 10 and 14) and, by shaping the said wheel spaces so as to obtain the contact at the point $n$ lying at a distance of 4.80 from the plane of the axes, the result shown by Figure 15 is obtained, in which the angle $abc$ is equal to:

$$\text{Ang. tan } \frac{\frac{1}{2} 19.39 - \frac{1}{2} 4.88}{2.935} = 0.93696 = 43° \ 8' \ 8''$$

In fact, in the said Figure 15, we find the data 2.935 and 4.88 locating the point of contact have been previously determined in correspondence of the point $n$ lying at a distance of 4.80 from the plane of the axes.

Therefore the following table has been formulated by taking into account the data already determined and proceeding from the points $n$ lying at different distances from the plane of the axes (see Figure 13).

$nv = 5.70 - 10.39 - (2.657 \times 0.93696 \times 2) = 5.403 > 5.344$ by $0.059$
$nv = 5.40 - 10.39 - (2.755 \times 0.93696 \times 2) = 5.219 > 5.192$ by $0.027$
$nv = 5.10 - 10.39 - (2.848 \times 0.93696 \times 2) = 5.045 > 5.036$ by $0.009$
$nv = 4.80 - 10.39 - (2.935 \times 0.93696 \times 2) =$ as Figure 15
$nv = 4.50 - 10.39 - (3.016 \times 0.93696 \times 2) = 4.731 > 4.728$ by $0.003$
$nv = 4.20 - 10.39 - (3.092 \times 0.93696 \times 2) = 4.587 > 4.566$ by $0.021$
$nv = 3.90 - 10.39 - (3.163 \times 0.93696 \times 2) = 4.455 > 4.408$ by $0.047$
$10.39 - (4.50 \times 0.93696 \times 2) = 1.948$ By reading the above table proceeding from the bottom line and upward, it is found that the first or last line is necessary only for determining the width of the bottom of the spaces.

In the second line from the bottom of the table it is found that at the point $n$, lying at a distance of 3.90 from the plane of the axes, there is no contact, as otherwise the width of the wheel spaces, always seen at right angles to a generatrix, should have been equal to 4.408, just as it appears from the calculations already effected at that point, but this width is actually 4.455 and therefore there is a difference of 0.047.

In the third line from the bottom of the table it appears that at the point $n$, lying at a distance of 4.20 from the plane of the axes, there is no contact due to a difference of 0.020.

In the fourth line from the bottom in which $nv = 4.50$ the difference is of 0.003 only.

In the fifth line from the bottom of the table the results show that with the point $n$ lying at a distance of 4.80 from the plane of the axes, there is a contact, as the width of the spaces at that point is that indicated in Figure 15.

And, at last, in the points $n$ related in the sixth, seventh and eighth lines from the bottom of the table there is no contact due to differences amounting to 0.009, 0.027 and 0.059, respectively.

Therefore I have demonstrated how the shaping of the wheel spaces in Figure 15 is determined when seen perpendicularly to a generatrix and from this, of course, it is easy to determine the shape of the teeth and I have also analytically demonstrated that by said shaping the contact is obtained only at the point $n$ lying at a distance of 4.80 from the plane of the axes.

But it is already known that there is a contact only at the point $r$. Therefore by joining the points $n$ and $r$ the line of contact $nr$ results, as set out at the beginning. Said contact line may be assumed as a straight line, as if a large number of other contact points be taken along the same line, following the proceeding as set out above, and then these points be joined with one another, it results just a straight line, as shown in Figure 13, because the differences are so small that they are not appreciable, particularly for the purpose of the irreversibility as will be demonstrated hereinafter.

As the above is exemplary of procedure followed, I do not extend my work herein to a determination of the other said points of contact, in order not to complicate the specification further.

Briefly the pinion teeth, as well as the wheel spaces, Figure 15, are seen perpendicularly to a generatrix, while for the machining it is necessary to determine the same figures as seen at right angles to their helices, as regards the steps to be followed in order to obtain said views, it is sufficient to proceed as has been said hereinbefore with regard to the reciprocal gears.

*Demonstration of the irreversibility*

By examination of the first table, it is found that at the right and left of the point $r$ there is no contact for such differences, that it is right to assume that the midline of the contact surface comes to lie just at 3.70 from the plane of the axes. Then, by examining the second table it is found that at the point $n$ lying at a distance of 4.50 from the plane of the axes there is no contact for a difference of so little as 0.003 while at the distance of 5.10 this difference amounts to 0.009; therefore it can be assumed that the midline of the contact surface comes to lie probably at the point $n$ lying at a distance of 4.70 from the plane of the axes.

Of course, a more exact mathematical determination could be obtained by effecting the operations on values which do not differ successively from one another by 0.3, as done, but by a smaller amount. If the said differences had been limited to 0.1, the data in Figure 15 depending on the value of $nv$ could have been determined directly from those derived from the value of $nv=4.70$.

In practice, however, the proceeding which has been adapted is amply sufficient.

Anyhow, referring to the contact point $r$, Figure 9, it is already known that $rz=3.70$ and $oz=17.261$. And referring to the contact point $n$, Figure 13, if $nv=4.70$ is, with great approximation $$ov = 20.238 + \frac{20.307 - 20.238}{2} = 20.261$$

(the data 20.307 and 20.238 correspond to the values of $ov$ referred to $nv=4.50$ and 4.80 respectively).

Therefore in the same Figure 13 is:

$$ov - oz = 20.261 - 17.261 = 3$$
$$nv - rz = 4.70 - 3.70 = 1$$

By drawing by means of these data a right angled triangle it results that the line $nr$ is inclined by 18° 26′ 4″ with respect to the plane of the axes.

In fact (see Figure 16)

$$\text{Ang. tan } abc = 1:3 = 0.33333 = 18° 26′ 4″$$

Of course, the length of line $nr$ is equal to the length of the hypothenuse $ab$, viz:

$$nr = ab = \sqrt{1^2 + 3^2} = 3.16$$

It is to be noted that, as line $nr$ is not disposed radially it lies between the teeth, on a plane whose inclination is different from the inclination of the profiles according to Figures 12 and 15. In fact, when a wheel space is seen perpendicularly to a generatrix and when considering that the width of the same space at the point $r$ is equal to 10.39, and as it has been assumed that $nv=4.70$, the width at the point $n$ is, with a great approximation, equal to:

$$4.88 - \frac{4.88 - 4.73}{3} = 4.83$$

The heights 4.88 and 4.73 correspond to the widths of the space at those two points $n$ lying respectively at the distance of 4.80 and 4.50 from the plane of the axes. (See 2nd table.)

Furthermore, by bearing in mind that the length of line $nr=3.16$, Figure 17 may be drawn, in which is:

$$\text{Ang. tan } abc = \frac{½10.39 - ½4.83}{3.16} = 0.87816 = 41° 17′ 17″$$

Therefore the contact surface between the teeth lies on a plane inclined by 41° 17′ 17″ and consequently its length is equal to $$\frac{3.16}{\cos 41° 17′ 17″} = 4.20$$

Let us now draw Figure 18, which is a diagrammatical view of a part of the wheel, in which the teeth are inclined according to the slant of the helices at the pitch circumference, viz:

$$\text{Ang. tan} \frac{224 \times 3.1416}{254} = 2.77051 = 70° 9′ 10″$$

It is apparent that Figure 19 is a reproduction of Figures 9 and 13.

By cutting the gear on line $nsr$, Figure 19, and by seeing said section perpendicularly to a generatrix, the Figure 20 is obtained, which is a partial view in which the surfaces of contact between the teeth are inclined, as known, by 41° 17′ 17″.

By indicating by P the peripheral stress impressed upon the wheel, see Figure 19, the surfaces in contact thrust each other with a force $$Q = \frac{P}{\cos 70° 9′ 10″} \text{ (see Figure 18)}$$

and by setting $P=$ kg. 100, is:

$$Q = \frac{100}{0.33952} = \text{kg. } 294.13$$

Furthermore:

$$F = P \tan 70° 9′ 10″ = 100 \times 2.77051 = \text{kg. } 277.05$$

This means that the axial thrust, viz. the stress at right angles to the wheel faces, equals kgs. 277.05. This stress is represented in Figure 20 by the forces S'Q' and S'Q″. It is apparent that, due to the inclination of the surfaces of contact between the teeth, there are the two parallelograms S', N', F', Q', and S', N″, F″, Q″.

It is apparent that while the resultants S'Q' and S'Q″ balance one another, the components S'F' and S'F″ produce their effects and from these also the forces S'r' and S'r″ are respectively obtained. But line r'S'r″ is parallel to contact line $nsr$, Figure 19 and therefore in the same Figure 19 the force S'r' is represented by $sT$, while the force S'r″, which is equal and opposite to S'r' is represented by the force $sT'$.

Therefore, from the peripheral stress, from the measure or the angle at the apex of the wheel and from the inclination of the surfaces of contact between the teeth it results that the gear pair is simultaneously subjected (see Fig. 19):

(1) To a peripheral stress $sP$ tending to turn the wheel in clockwise direction.

(2) To the force $sT'$ tending to the same purpose.

(3) To the force $sT''$ tending to stop the rotation of the gears.

At the same time, from Figure 20 it results:

$$S'F' = S'Q' \cos 41° 17′ 17″ = 277.05 \times 0.75141 = 208.17$$

and $$S'r' = S4F' \cos (90° - 41° 17′ 17″) = 208.17$$
$$\cos 48° 42′ 43″ = 208.17 \times 0.65985 = \text{kg. } 137.36$$

Of course, also $S'r'' = $ kg. 137.36.

Now, in Figure 19, from the forces $sP$ and $sT$ the resultant $sR$ is obtained.

But $sP=100$, $sT=137.36$—hence:

$$sR = \sqrt{100^2 \times 137.36^2} = \text{kg. } 169.90$$

The effect of this resultant, with respect to the wheel only, is equal to $$sR \times o'H$$

Now the lever arm will be determined in the following manner:

The point $s$ comes to be at half the distance between the points $n$ and $R$.

If from the same point $s$ the perpendicular $sc$ to line $oo'$ is dropped, by bearing in mind that in Figure 13 $nv=4.70$, $rz=3.70$ I can write:

$$sc = \frac{4.70+3.70}{2} = 4.20$$

But by bearing in mind that, in the same Figure 13 $ov=20.261$ and $oz=17.261$, it follows (see Fig. 19):

$$oc = 17.261 + \frac{20.261-17.261}{2} = 18.761$$

hence $$o'c = 131 - 18.761 = 112.239$$

and $$o's = \sqrt{o'c^2 + sc^2} = \sqrt{112.239^2 + 4.20^2} = 112.317$$

As however:

$$\text{Ang. tan } so'c = \frac{sc}{o'c} = \frac{4.20}{112.239} = 0.03742 = 2° 8' 35''$$

The angle $Bso'$ is equal to angle $so'c$, hence

Ang. $Eso' =$ ang. $EsB +$ ang. $Bso' =$
$18° 26' 4'' + 2° 8' 35'' = 20° 34' 39''$ Then:

$$\text{Ang. tan } RsP = \frac{137.36}{100} = 1.37360 = 53° 56' 40''$$

As the angle $EsP = 90°$, is:

Ang. $o'sH = 90° -$ (ang. $Eso' +$ ang. $RsP$) $=$
$90° - (20° 34' 39'' + 53° 56' 40'') = 15° 28' 41''$ And the required lever arm is:

$o'H°o's$ sin $15° 28' 41'' = 112.317 \times 0.26689 = 29.97$

Therefore the effect of the resultant $sR$ multiplied by the said lever arm is equal to:

$sR \times o'H = 169.90 \times 29.97 =$ kgmm. $5091.90$

Consequently the lever arm on which the peripheral stress $sP$ acts is:

$o'A = o's$ cos ang. $so'P = 112.317 \times $cos
$20° 34' 39'' = 112.317 \times 0.93620 = 105.15$ But $sP \times o'a = 100 \times 105.15 =$ kgmm. $10515$ (1)

Hence it results that the force $sT$ reduces the effect of the peripheral stress from the product $sP \times o'A = 10515$ to the product $sR \times o'H = 5091.90$.

This means that the force $sT$ produces a braking effect that is equal to $10515 - 5091.90 = 5423.10$ kgmm. (2)

At the same time the resultant $sR$, due to its direction, produces a thrust, passing through the wheel centre, which is equal to the intensity of the force $sM$. But, by analogy to what happens in all other wheels geared between parallel axes, to force $sM$ is opposed force $sF$, that is equal and in opposite direction, which tends to cause the pinion to turn in a direction that is opposite to the peripheral stress. On the contrary the force $sT'$, that is equal and in opposite direction to force $sT$ tends to cause the pinion to turn in the direction of the peripheral stress.

Therefore the resultant of said opposite forces, when summed to (2), will give the amount of the definitive braking.

Now:

$sF = sM = sR$ cos ang. $o'sH = 169.90$ cos
$15° 28' 41'' = 169.90 \times 0.96374 = 163.73$ $oO = oo'$ sin ang. $so'c = 131$ sin
$2° 8' 35'' = 131 \times 0.03739 = 4.89$ hence $sF \times oD = 163.73 \times 4.89 = 800.63$ kgmm. (A)

Then: As however the angle $sec$ is equal to the angle $EsB = 18° 26' 4''$, it results that:

$$ec = \frac{sc}{\tan 18° 26' 4''} = \frac{4.20}{0.33333} = 12.60$$

and $$oe = oc - ec = 18.761 - 12.60 = 6.161$$

hence:

$oN = oe$ sin $18° 26' 4'' = 6.161 \times 0.31621 = 1.98$

But $$sT' = 137.36$$

hence:

$sT' \times oN = 137.36 \times 1.98°$ $271.97$ kgmm. (B)

By subtracting the (B) from (A) the numerical values are:

$800.63 - 271.97 = 528.66$ kgmm.

Now is:

$$os = \sqrt{oc^2 + sc^2} = \sqrt{18.761^2 + 4.20^2} = 19.22$$

furthermore:

$528.66 : 19.22 = 27.50$ kg.

Hence the resultant of the forces $sF$ and $sT'$ is a stress of kgs. 27.50 acting perpendicularly to line $nsr$, in a direction that is opposite to the peripheral stress $sP$ and, is, of course, applied by a lever arm $o'A$.

But, when bearing in mind that $o'A = 105.15$, it follows that:

$27.50 \times 105.15 = 2891.62$ (3)

By summing (2) with (3) it now follows that:

$5423.10 + 2891.62 = 8314.72$ (4)

This means that at the end the wheel is subjected simultaneously to the motive action (1) and to the braking action (4), whose ratio is:

$$\frac{8314.72}{10515} = 0.79$$

Therefore the driving action due to the peripheral stress is counteracted by a braking action amounting to 79% of the said motive or driving action.

Thus the irreversibility of gears with parallel axes has been demonstrated.

To confirm the findings the output of 70% has been independently determined by the professors of the Royal High School of Engineering of Naples—by executing the measurements in two different experimental laboratories and by employing both different apparatus and means.

Furthermore it is pointed out that in my previous patents of many years ago the irreversibility between parallel axes was also claimed, but the proceeding for putting the work into practice was absolutely insufficient and therefore it has never led to practical results. Therefore, for the sake of history, it is to be pointed out that some years ago only a vague principle has been dimly seen and that many years of study and experiment have been necessary in order to arrive at the satisfactory conclusion which has been amply demonstrated above.

It is to be noted that, whenever a power is to be transmitted that is greater than the power which is possible to transmit by means of a single pinion, it will be sufficient to gear with the driven wheel a number of pinions (two or three, according to whether the power to be transmitted is double or triple) without however modifying the elements of the driven wheel.

Of course, said pinions must be connected together and to the motor shaft M by any known means (conventional gears, chains, wedge-shaped belts and so on) as demonstrated by way of example in Figures 22 to 23.

It is also apparent that it is easily possible also to increase the velocity ratio given by a single pinion geared to the wheel by acting on the drives contained in the said drawings 21, 22 and 23.

I claim:

1. A gear pair which includes a driving gear and a driven gear having helical teeth and running between parallel axes and said driven gear having a reduced pitch circle diameter for the velocity ratio of the gear pair and the teeth of said gear pair having such profile that the contact between the teeth in mesh extends substantially over the whole of the area bounded by the arcs of engagement between the gears.

2. A reciprocal gear pair of which either gear of the pair may be driven by the other, said gears having intermeshing helical teeth with side surfaces of which the side surface of a tooth of one gear provides arcuate areas in intermeshing engagement with arcuate areas of side surfaces of teeth of the other gear, one of the arcuate areas at each region of interengagement of the teeth being concave to a predetermined contour providing surface contact of the arcuate areas of opposite surfaces of one said tooth meshing between two others.

3. An irreversible gear pair of which a first one of the pair is a driving gear and the second one of the pair is a driven gear, said gears having intermeshing helical teeth, a tooth of the driving gear having a driving side surface and a tooth of the driven gear having a driven side surface addressed toward the said driving surface, and said surfaces each having arcuate areas thereof transverse to the helix of the tooth, said surfaces being in contact with each other in meshing engagement of the said teeth, and one of said surfaces being concave with respect to a radius of the gear to a predetermined contour conforming its arcuate area to the addressed arcuate area of the other surface.

ALESSANDRO ROANO.

REFERENCES CITED

The following references are of record in the file of this patent:

UNITED STATES PATENTS

| Number | Name | Date |
|---|---|---|
| 1,772,683 | Roano | Aug. 12, 1930 |

FOREIGN PATENTS

| Number | Country | Date |
|---|---|---|
| 321,672 | Great Britain | Nov. 15, 1929 |
| 376,791 | Great Britain | July 12, 1932 |
| 719,727 | France | Nov. 23, 1931 |